(12) United States Patent
Kirby, Jr.

(10) Patent No.: US 8,930,889 B2
(45) Date of Patent: *Jan. 6, 2015

(54) SOFTWARE MODELING SYSTEM AND METHOD

(71) Applicant: James Kirby, Jr., Columbia, MD (US)

(72) Inventor: James Kirby, Jr., Columbia, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 192 days.

This patent is subject to a terminal disclaimer.

(21) Appl. No.: 13/766,024

(22) Filed: Feb. 13, 2013

(65) Prior Publication Data

US 2013/0227518 A1    Aug. 29, 2013

Related U.S. Application Data

(63) Continuation-in-part of application No. 11/288,055, filed on Nov. 17, 2005, now Pat. No. 8,397,209.

(51) Int. Cl.
*G06F 9/44* (2006.01)

(52) U.S. Cl.
CPC ... *G06F 8/20* (2013.01); *G06F 8/10* (2013.01)
USPC ........... 717/104; 717/105; 717/108; 717/109; 717/116

(58) Field of Classification Search
None
See application file for complete search history.

(56) References Cited

U.S. PATENT DOCUMENTS

| | | | | |
|---|---|---|---|---|
| 6,212,672 | B1* | 4/2001 | Keller et al. | 717/104 |
| 6,681,383 | B1* | 1/2004 | Pastor et al. | 717/126 |
| 7,194,726 | B2* | 3/2007 | Allen et al. | 717/104 |
| 2002/0104068 | A1* | 8/2002 | Barrett et al. | 717/104 |
| 2002/0108101 | A1* | 8/2002 | Charisius et al. | 717/105 |
| 2003/0046130 | A1* | 3/2003 | Golightly et al. | 705/7 |
| 2003/0167455 | A1* | 9/2003 | Iborra et al. | 717/105 |
| 2004/0015858 | A1* | 1/2004 | Seto et al. | 717/120 |

* cited by examiner

*Primary Examiner* — Isaac T Tecklu
(74) *Attorney, Agent, or Firm* — US Naval Research Laboratory; Kerry L. Broome (57) ABSTRACT

A device for modeling a software application includes an environmental model that includes a first set of attributes. The first set of attributes includes a value attribute, a declaration, and a set of meta-attributes. A behavioral model includes a second set of attributes, including a portion of the first set of attributes, wherein the environmental and behavioral models share the portion. The second set of attributes includes a value attribute and set of meta-attributes, each having at least one of a declaration and function. Changes to an attribute in the behavioral model reflect in all models that share the attribute. A design model includes a first decomposition of the second set of attributes into a first plurality of groups. A run-time model includes a second decomposition of the second set of attributes into a second plurality of groups, and records the decomposition of the behavioral model into run-time components.

21 Claims, 8 Drawing Sheets

SOFTWARE MODELING SYSTEM AND METHOD

CROSS-REFERENCE TO RELATED APPLICATION

This application is a continuation-in-part application of a U.S. Non-Provisional Patent Application, "Software Modeling System and Method," which was filed on Nov. 17, 2005, and assigned U.S. application Ser. No. 11/288,055; the entire contents of which are hereby incorporated by reference.

FIELD OF THE INVENTION

The invention relates generally to a software development system. More particularly, the invention relates to a software development system and its associated tool set, which support an incremental, iterative, model-driven process to build and maintain high assurance distributed software systems.

BACKGROUND

For high assurance, distributed systems, just delivering working software is insufficient. For the software to be acceptable, the customer must have confidence that it has certain critical properties (e.g., security, safety). Some of that confidence is derived from documentation that is typically a byproduct of the software development process, e.g., requirements and design specifications, test plans and results. Assurance arguments, relying on the documentation and the code as supporting evidence, and the results of applying various sorts of automated checkers (e.g., theorem provers, verifiers, model checkers) to the documentation and to the code may also contribute to confidence in the software.

The concerns of a software development method are the decisions that developers make, how developers record and organize those decisions, and how they evaluate them for important properties. While guidance on how developers make these decisions is also important, some decisions of particular interest deal with the boundary of the software with its environment; the behavior of the software that is visible at the boundary; the pieces into which the software is decomposed; and the interface that one piece of the software presents to other pieces.

In contrast, the concerns of a software development process are the ordering of the decisions and the use of resources, e.g., programmer effort, schedule. Some decisions that concern the software development process deal with when to start coding; when to deliver software; and who will do the work.

Agile development is a process focused on frequent delivery of working software and on responsiveness to customer needs. Frequent delivery of working software helps distinguish progress from motion, which can be hard to distinguish in a document-centered process that only produces working code near the end of development. Agile development is code-centric; it largely forgoes developing and delivering work products other than code, e.g., requirements and design models.

In stark contrast to agile development, model-driven development's defining characteristic is that software development's primary focus and products are models rather than computer programs. Model-driven development's full benefits can only be achieved when it generates complete programs from models (as opposed to just code skeletons and fragments).

As with software development in general, high assurance software development suffers from the sort of problems that agile development's ability to distinguish progress and motion can ameliorate. High assurance projects go over budget and schedule, fail to deliver promised functionality on time, or fail to deliver at all. Being able to discern early that while the project is generating many documents, it is making no progress toward delivering a system can make it possible to fix project problems before it is too late. However, applying agile development to high assurance software is problematic: a key principle eschews exactly the documentation that assurance arguments require as evidence.

What is needed is a software development method and its associated tool set, which support an incremental, iterative, model-driven process to build and maintain high assurance distributed software systems. More specifically, what is needed is a system and method that will enable a user to create a set of interconnected models addressing distinct concerns of software development that provide documentation supporting high assurance certification efforts, that tools can analyze for important classes of errors, that support maintenance and reuse of the models, and from which tools can generate complete distributed software systems.

SUMMARY OF THE INVENTION

It is an object of the present invention to provide a system and method that will enable a user to create a set of interconnected models that provide documentation supporting high assurance certification efforts, that tools can analyze for important classes of errors, that support maintenance and reuse of the models, and from which tools can generate both complete distributed software systems and complete monolithic software systems.

According to one aspect of the invention, a device for modeling a software application to be used in an environment is provided. An environmental model creating portion can be configured to enable a user to create an environmental model including a first set of attributes of the environment, each of the first set of attributes including a value attribute, a declaration, and an associated set of meta-attributes, each of said meta-attributes including at least one of a declaration and function. A behavioral model creating portion can be configured to enable the user to create a behavioral model to describe behavior of the software application at a boundary of the software application and the environment, the behavioral model including a second set of attributes, which include a portion of the first set of attribute, wherein the portion of the first set of attributes is shared between the environmental model and the behavioral model; each of the second set of attributes including a value attribute having at least one of a declaration and function, and a set of meta-attributes, each of said meta-attributes having at least one of a declaration and function; wherein changes to an attribute in the behavioral model is reflected automatically in all models that share the attribute. A design model creating portion can be configured to enable the user to create a design model including a first decomposition of the second set of attributes into a first plurality of groups. A run-time model creating portion can be configured to enable the user to create a run-time model including a second decomposition of the second set of attributes into a second plurality of groups, the run-time model being operable to record the decomposition of the behavioral model into run-time components. The environmental model, behavioral model, design model, and run-time model can be implemented in a computer system that includes instructions stored in a machine-readable medium and a processor that executes the instructions.

According to another aspect of the invention, a method of modeling a software application to be used in an environment can be provided. An environmental model can be created that includes a first set of attributes of the environment, each of the first set of attributes including a value attribute, a declaration, and a set of associated meta-attributes, and each of said meta-attributes including at least one of a declaration and function. A behavioral model can be created to describe behavior of the software application at a boundary of the software application and the environment, the behavioral model including a second set of attributes, which include a portion of the first set of attributes, wherein the portion of the first set of attributes is shared between the environmental model and the behavioral model; each of the second set of attributes including a value attribute and at least one of a declaration and function, and a set of meta-attributes, each of said meta-attributes having at least one of a declaration and function; wherein changes to an attribute in the behavioral model is reflected automatically in all models that share the attribute. A design model can be created including a first decomposition of the second set of attributes into a first plurality of groups. Finally, a run-time model can be created including a second decomposition of the second set of attributes into a second plurality of groups, the run-time model being operable to record the decomposition of the behavioral model into run-time components.

Additional objects, advantages and novel features of the invention are set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate exemplary embodiments of the present invention and, together with the description, serve to explain the principles of the invention.

DETAILED DESCRIPTION OF EXEMPLARY EMBODIMENTS

In accordance with the present invention, a user is able to model a system and the environment in which the system will interact by writing mathematical functions or relations that specify the values of selected attributes of the system and of the environment. Once modeled, the present invention additionally enables a user to control and/or monitor aspects of the environment. In other words, in accordance with the present invention, a modeling system enables a user to design, implement, and operate a real world system.

Figure 1:
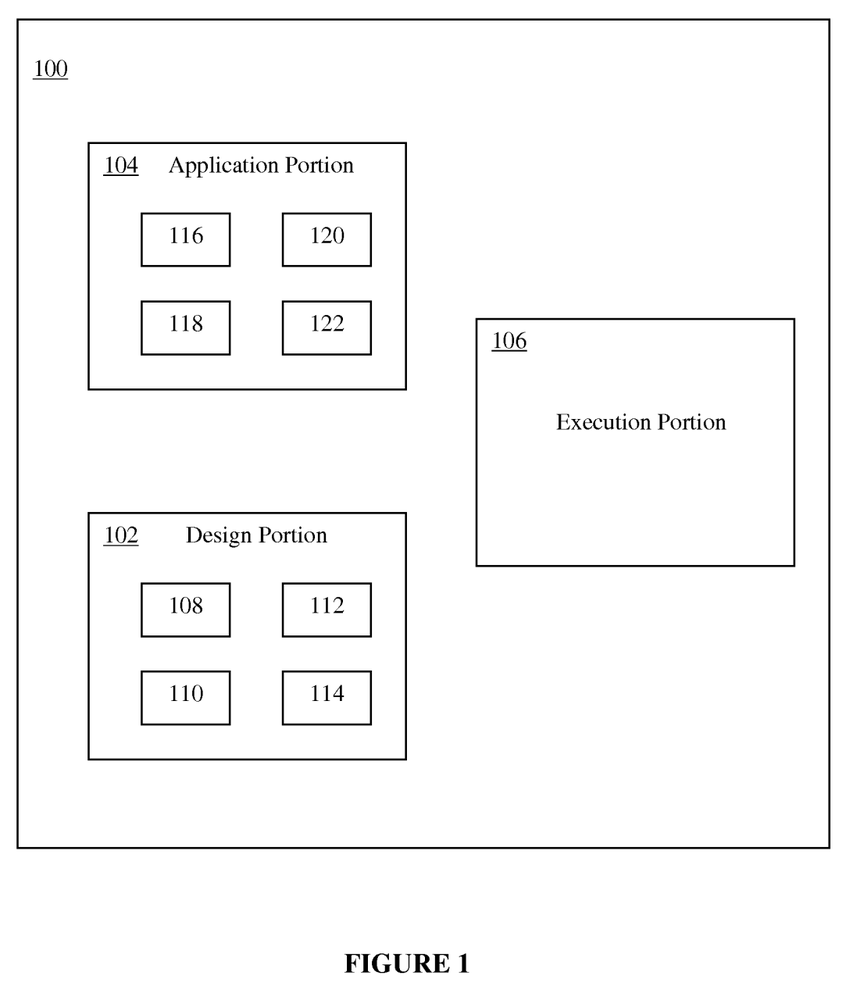
FIG. 1 illustrates a modeling system in accordance with one aspect of the present invention.

FIG. 1 illustrates a modeling system 100 in accordance with one aspect of the present invention. As illustrated in FIG. 1, modeling system 100 includes a design portion 102, an application portion 104 and an execution portion 106. Design portion 102 includes four portions: an Environmental Model creating portion 108, a Behavioral Model creating portion 110, a Design Model creating portion 112 and a Run-time Model creating portion 114. Application portion 104 includes four portions: an Environmental Model 116, a Behavioral Model 118, a Design Model 120 and a Run-time Model 122. Design portion 102 is operable to enable a user to create application portion 104. Specifically: Environmental Model creating portion 108 enables a user to create and modify Environmental Model 116; Behavioral Model creating portion 110 enables a user to create and modify Behavioral Model 118; Design Model creating portion 112 enables a user to create and modify a Design Model 120, and Run-time Model creating portion 114 enables a user to create and modify a Run-time Model 122.

In an exemplary embodiment, each of Environmental Model creating portion 108, Design Model creating portion 112, and Run-time Model creating portion 114 use Unified Modeling Language (UML) class model notation. With the UML class notation, aspects of the environment and system may be established as a class. Further, each class may be subdivided into a plurality of classes called "subclasses." Finally, with the UML class notation, each class may include at least one attribute characterizing quantities and/or qualities of the system or its environment. Further, using UML class model notation, each of Environmental Model creating portion 108, Design Model creating portion 112, and Run-time Model creating portion 114 enables a user to declare attributes, assigning them names, types that characterize the values the attributes may assume and interpretations that describe how the values of each attribute relates to the aspect it denotes. The interpretations may comprise prose, pictures and diagrams. Once declared, each attribute may be specified by at least one associated function or relation, and may be common to a plurality of classes. Behavioral Model creating portion 110 enables a user to describe the behavior (e.g., functionality business logic, etc.) of the software at its boundaries with its environment and how that behavior is accomplished by declaring attributes, types, constants, functions, relations, properties and assumptions. The composition of declarations is Behavioral Model 118. Changes to an attribute declaration or function in one class, or in Behavioral Model 118, are reflected automatically in all models and classes that share the attribute. Changes to other aspects of a class, which reflect concerns unique to that class, do not affect other models or classes. In the exemplary embodiment, the present invention enables the user to use standard UML notation to record relationships among the classes, the relative cardinality of the objects abstracted by the classes and the cardinality of the attributes of each object.

Figure 2:
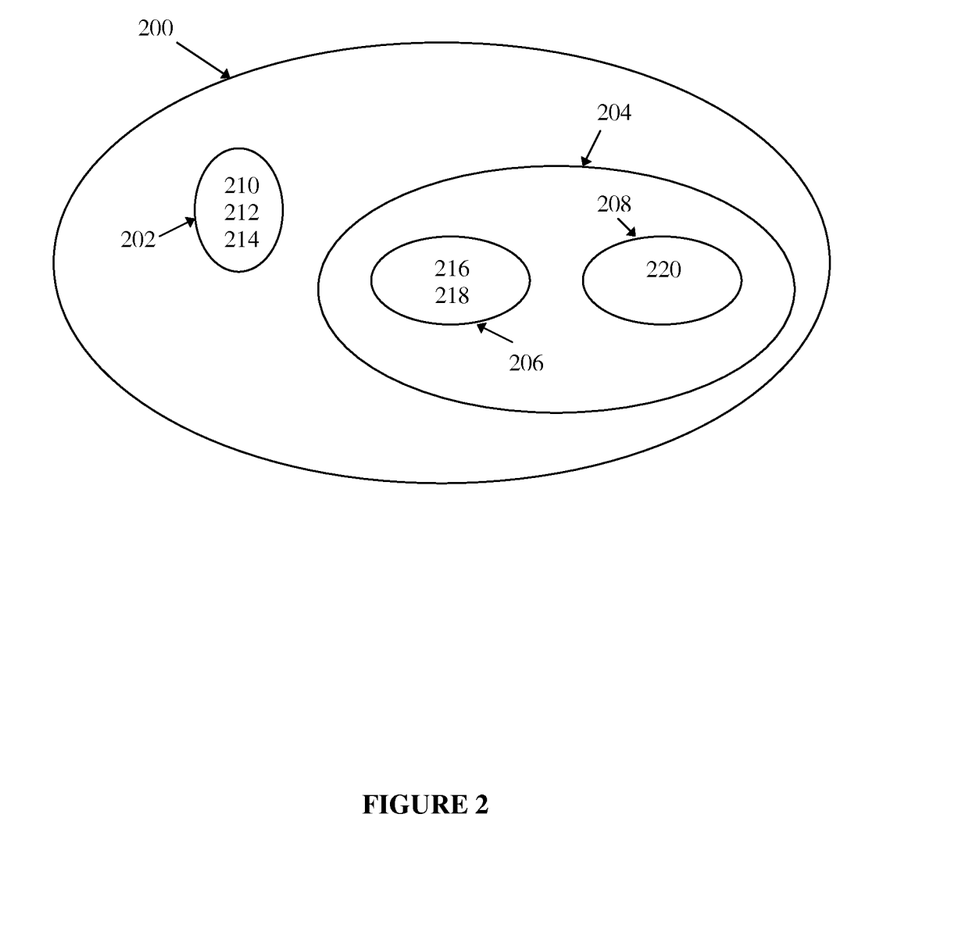
FIG. 2 illustrates a class model notation in accordance with one aspect of the present invention.

FIG. 2 illustrates a class model notation wherein class 200 includes subclasses 202 and 204. Subclass 204 further includes subclasses 206 and 208. Subclass 202 comprises attributes 210, 212 and 214. Subclass 206 comprises attributes 216 and 218. Subclass 208 includes a single attribute 220. A specification may be considered to be the compilation of any one or more of the modules.

To describe the present invention by way of example, presume that a ship requires a control panel to operate a plurality of systems. The control panel is required to include a plurality of user operated controls and a plurality of user displays. Further, the control panel is required to be located in an engine room in the hull of the ship. The present invention enables a user to model the system, i.e., the software system and to model the environment, i.e., the control panel in the engine room in the hull of the ship, by establishing attributes. The attributes are based on the physical properties of the control panel and the systems that the control panel controls. The attributes are further based on the relationship between the physical properties of the control panel (and the systems that the control panel controls) and the software that executes, controls and/or monitors functions of the control panel. More specifically, some attributes denote quantities and qualities in the environment, some denote physical inputs and outputs of the software system, and other attributes represent quantities and qualities chosen for the convenience of modeling. With reference to FIG. 2, in this example: class 200 may correspond to the environment in which the software will be located, i.e., the control panel; subclass 202 may correspond to the human operable input switches, wherein attributes 210, 212 and 214 correspond to main power on/off, display on/off and sound on/off, respectively; subclass 204 may correspond to inputs/outputs related to the control panel; subclass 206 may correspond to data inputs, wherein attributes 216 and 218 correspond to sensor inputs; and subclass 208 may correspond to data outputs, wherein attribute 220 corresponds to an alarm signal to be sent to an external siren. Although not illustrated in this example, but nonetheless discussed above, attributes may be common to a plurality of subclasses.

Figure 7:
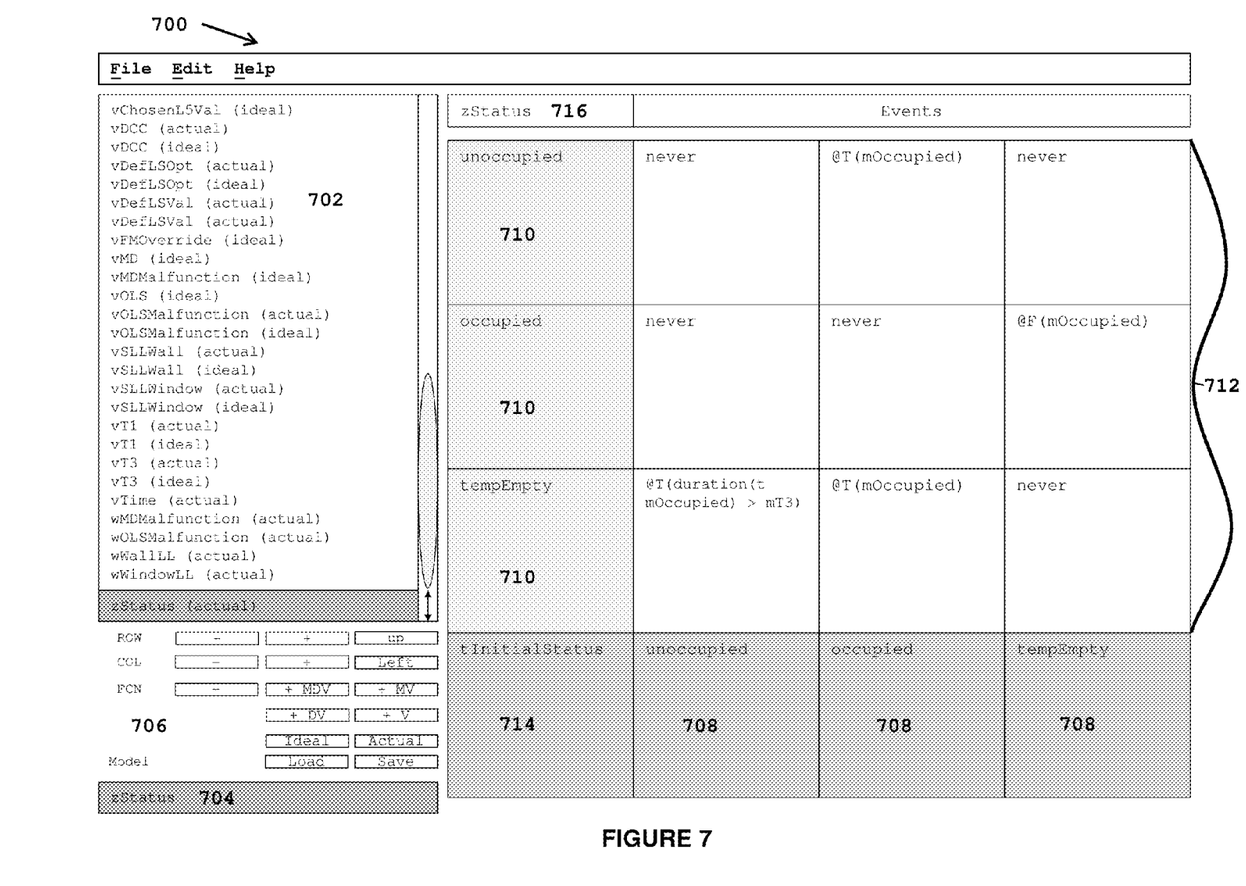
FIG. 7 is an exemplary tabular representation of an attribute and an associated function and/or relation in accordance with the present invention.

FIG. 7 illustrates an exemplary screenshot 700 of a graphic user interface to enable a user to edit an attribute function in accordance with the present invention. Screenshot 700 includes a list 702 of the dependent attributes in a model, item 704 indicates the current attribute being specified, items 706 indicate editing functions, item 716 indicates the name of an attribute and the matrix comprising items 708, 710, 712 and 714 define the relation of current attribute 704. In the figure, the row indicated by 714 and 708 describes the values that current attribute 704 can assume. Item 712 is a matrix of event specifications and item 710 lists values that attribute 716 can assume. Item 714 describes the value that current attribute 704 assumes on system initialization. Subsequent to system initialization, items 716, 710, and 712 specify rules determining when the value of current attribute 704 changes and which value described by 708 it assumes. At any instant, attribute 716 assumes exactly one of the values listed in 710. That value selects the corresponding row in matrix 712. When an event in that row fires, current attribute 704 assumes the value described by the value description in the same column of 708. When no event fires, the value of current attribute 704 remains unchanged. When events in more than one column of the selected row of matrix 712 fire, current attribute 704 nondeterministically assumes one of the values described in the selected columns of 708.

Figure 3A:
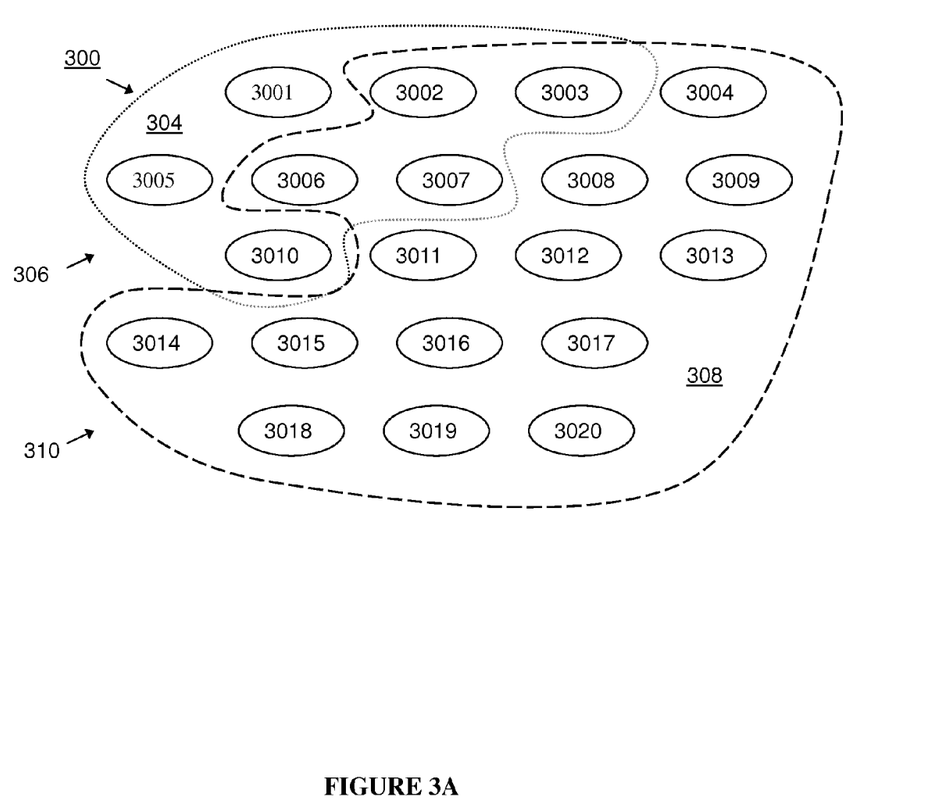
FIG. 3A illustrates a specification of an exemplary system and environment that includes a compilation of classes.

As illustrated in FIG. 3A, an exemplary system and environment is described as a specification 300 that includes a compilation of attributes 3001-3020, wherein each of attributes 3001-3020 may be specified by at least one function or relation. By way of example, the environment is described by the Environmental Model 304 containing attributes 3001-3003, 3005-3007 and 3010 as illustrated by the dotted line 306, whereas the system is described by the Behavioral Model 308 containing attributes 3002-3004, 3006-3009 and 3011-3020 as illustrated by the dashed line 310. In this example, attributes 3002, 3003, 3006 and 3007 are common to Model 304 and Model 308.

A more detailed description of design portion 102 and application portion 104 will now be described.

Environmental Model creating portion 108 enables a user to declare the environmental attributes and the environmental classes. The composition of the declared environmental attributes and environmental classes is Environmental Model 116. Similarly, Behavioral Model creating portion 110 enables a user to describe the behavior (e.g., functionality and business logic) of the software at its boundaries with its environment and how that behavior is accomplished by declaring attributes, types, constants, functions, relations, properties and assumptions. The composition of declarations is Behavioral Model 118.

As discussed above, some attributes may be shared by Environmental Model 116 and Behavioral Model 118. Accordingly, if Environmental Model 116 exists, the present invention inserts some of the environmental attributes of Environmental Model 116 into Behavioral Model 118. On the other hand, if Behavioral Model 118 is created first, some of the attributes therein are available to Environmental Model 116. In other words, the present invention enables a non-linear creation scheme wherein either one of Behavioral Model 118 or Environmental Model 116 may be created first. Further, any modification of a shared attribute will be recognized by Environmental Model 116 and Behavioral Model 118. Thus, the present invention enables a non-linear modification scheme.

Design Model creating portion 112 enables a user to decompose Behavioral Model 118 into classes that are responsible for distinct concerns. This decomposition of Behavior Model 118 is Design Model 120 and is independent of a run-time organization of the software. Run-time Model creating portion 114 enables a user to decompose Behavioral Model 118 into run-time components. This decomposition of Behavioral Model 118 is Run-time Model 122.

Figure 3B:
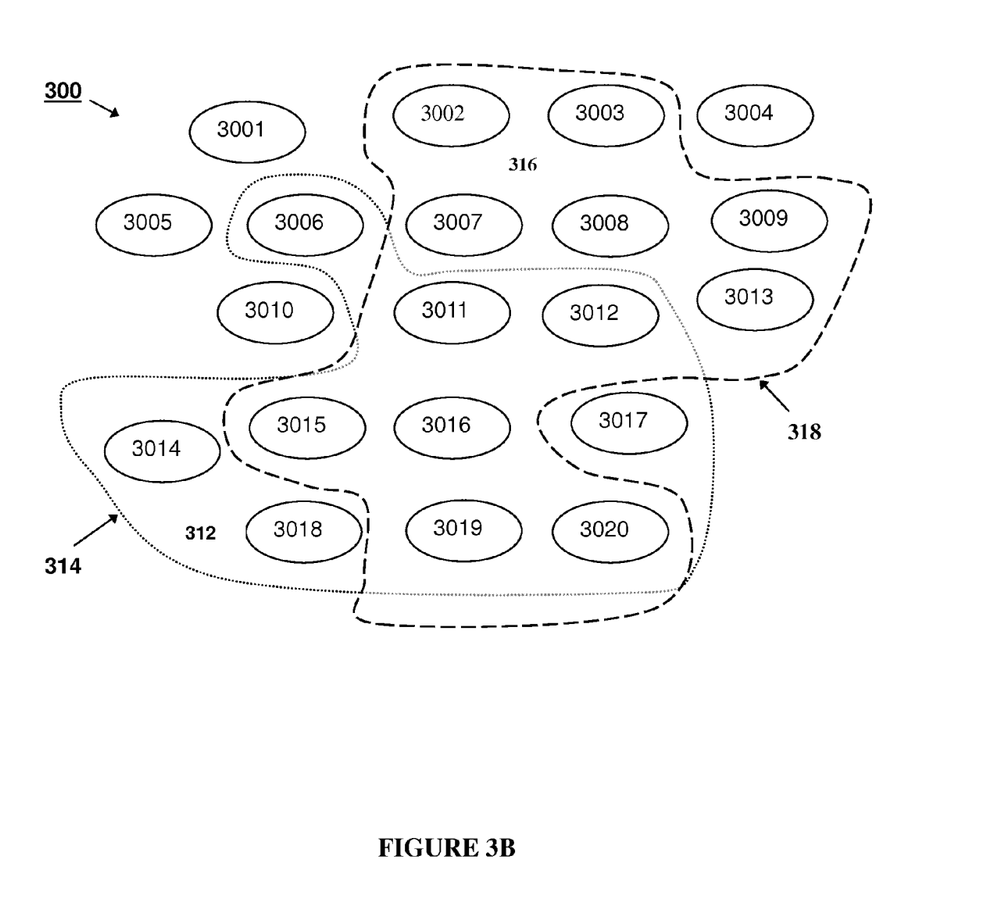
FIG. 3B illustrates the specification of FIG. 3A, wherein the attributes of a Behavioral Model are decomposed into a Design model and a Run-time Model in accordance with one aspect of the present invention.

FIG. 3B provides a graphical representation of the relationship between Behavioral Model 118, Design Model 120 and Run-time Model 122. As illustrated in FIG. 3A, model 308 corresponds to Behavioral Model 118 and comprises the group of attributes 312, the group of attributes 316 and attribute 3004. Group 312, indicated by dotted line 314, which includes attributes 3006, 3011, 3012 and 3014-3020 corresponds to Design Model 120. Group 316, indicated by dashed line 318, which includes attributes 3002, 3003, 3007-3009, 3011-3013, 3015, 3016, 3019 and 3020 corresponds to Run-time Model 122. It should be noted that, in this example, attributes 3011, 3012, 3015, 3016, 3019 and 3020 are common to group 312 and group 316. Therefore, any modification of attributes 3011, 3012, 3015, 3016, 3019 and 3020 will be recognized by Design Model 120 and Run-time Model 122. Further, it should be noted that, in this example, attributes 3002, 3003 and 3007 are common to group 304 and group 316. Therefore, any modification of attributes 3002, 3003 and 3007 will be recognized by Environmental Model 116 and Run-time Model 122. Still further, it should be noted that, in this example, attribute 3006 is common to group 304 and group 312. Therefore, any modification of attribute 3006 will be recognized by Environmental Model 116 and Design Model 122.

A more detailed discussion of Environmental Model 116, Behavioral Model 118, Design Model 120 and Run-time Model 122 will now be provided.

Behavior of a system is modeled in terms of selected environmental attributes. The present invention enables the user to establish which environmental attributes the software system is to control, manipulate or affect. These attributes are referred to as controlled attributes. The values the controlled attributes assume over time define the system behavior. The present invention enables the user to establish which environmental attributes determine the values of the controlled attributes. These attributes are referred to as monitored attributes. Table 1 below lists the information that may appear in the declaration of an environmental attribute.

TABLE 1

Environmental Attribute Declaration

| Field | Description |
|---|---|
| Monitored or Controlled or Environmental | Does the system monitor the attribute value, control it, or has that decision not been recorded? |
| Name | User-assigned name of the attribute. |
| Type | Name of the attribute type or a list of values the attribute can assume. |
| Interpretation | Description of how the attribute value relates to the environmental aspect it denotes, which may include diagrams and drawings. |
| Response time | For a controlled attribute, the time delay between some change in the environment and the change in the environment denoted by the corresponding change in value of a controlled variable. For a monitored attribute, the time delay between some change in the environment and the corresponding change in value of a monitored attribute. |
| Precision | The precision with which an attribute represents a physical quantity. |
| Accuracy | The accuracy with which an attribute represents a physical quantity. |
| Reliability | Characterization of the reliability of the attribute's representation of the physical quantity. |

The present invention enables the user to declare additional attributes, called terms, for the convenience of describing the behavior. The present invention enables the user to assign the terms' names and types that characterize the values that they can assume. For a mode-dependent system, one whose behavior varies significantly depending upon the system's mode of operation (e.g., initialization, normal operation, alarm), the present invention enables the user to declare one or more attributes called mode classes to capture the modes. The declaration of each mode class gives it a name and a type, which identifies the names of the modes in the mode class. Table 2 below lists the information that may appear in term and mode class declarations.

TABLE 2

Software Design Attribute Declaration

| Field | Description |
|---|---|
| Term or Mode Class or Virtual Input or Virtual Output | The class of the attribute. |
| Name | User-assigned name of the attribute. |
| Type | Name of the attribute type or a list of values the attribute can assume. |
| Interpretation | A description of how to interpret the value of the attribute. |

The invention enables the user to define mathematical functions or relations that specify the values of controlled attributes. The domain of each controlled attribute function may comprise monitored attributes, controlled attributes, mode classes and terms (denoted M, C, Z and T, respectively). Function $f_i^c : M \times T \times Z \times C \to c_i$ specifies the value of $i^{th}$ controlled attribute, $c_i$. Each function specifies the value of one controlled attribute, though the present invention provides useful presentations of behavior that do not make this organization visible. The user may define additional mathematical functions that specify the values of the mode classes and the terms. Each function specifies the value of one mode class or term. The domain of the function may comprise monitored attributes, controlled attributes, mode classes, and terms. $f_i^Z : M \times T \times Z \times C \to z_i$ specifies the value of the $i^{th}$ mode class; $f_i^T : M \times T \times Z \times C \to t_i$ specifies the value of the $i^{th}$ term.

The invention enables the user to declare additional attributes called virtual inputs, virtual outputs, physical inputs and physical outputs (denoted V, W, I and O, respectively). The declaration of each of these additional attributes identifies its name and type. Table 2 lists the information that may appear in virtual input and output declarations. Physical inputs and outputs denote interfaces to physical devices, systems, and software. Their declarations include descriptions of how to read physical inputs and write physical outputs, respectively. Table 3 below lists the information that may appear in physical input and output declarations.

TABLE 3

Physical Input and Output Attribute Declaration

| Field | Description |
|---|---|
| Physical Input or Physical Output | The class of the attribute. |
| Name | User-assigned name of the attribute. |
| Type | Name of the attribute type or a list of values the attribute can assume. |
| Reading or Writing | Description of how to read/write the physical input/output. |

Virtual inputs and outputs provide stable virtual devices that abstract from aspects of the physical devices, systems, and software that a user judges is likely to change. The ideal value of each virtual input or physical input—the input's behavior—is defined by a mathematical function in terms of monitored attributes. The function $g_i^V : M \to v_i$ gives the ideal value of the $i^{th}$ virtual input. The function $h_i^I : M \to i_i$ describes the ideal behavior of the $i^{th}$ physical input. Additional functions provide actual or calculated values of the virtual inputs and monitored attributes. The $i^{th}$ virtual input is calculated by $f_i^V : I \to v_i$. The $i^{th}$ monitored attribute is calculated by $f_i^M : V \to m_i$. The ideal effects of setting the value of each virtual output or physical output—the output's behavior—is defined by functions giving the value of controlled attributes in terms of the value of the virtual outputs or physical outputs. The function $g_i^C : W \to c_i$ describes the ideal effect of setting the virtual outputs on the $i^{th}$ controlled attribute. The function $h_i^C : W \to c_i$ describes the ideal effect of setting the physical outputs on the $i^{th}$ controlled attribute. Additional functions provide actual or calculated effects of setting virtual outputs and controlled attributes. The actual or calculated effect of setting the $i^{th}$ virtual output is provided by all functions of the form $f_j^O : W \to o_j$, such that $w_i$ is in the domain of $f_j^O$. Similarly, the actual or calculated effect of setting the $i^{th}$ controlled attribute is provided by all functions of the form $f_i^W : C \to w_i$ such that $c_i$ is in the domain of $f_i^W$. The declarations of the virtual inputs and outputs and the functions specifying the values of the virtual inputs and the effects of setting the virtual outputs record software design decisions.

Table 4 below summarizes Behavioral Model 118.

TABLE 4

Behavioral Model

| Attributes | | Functions |
|---|---|---|
| Controlled attributes | $C_f: M \times T \times Z \times C \to C$ | Behavior of controlled attributes. |
| | $W_f: C \to W$ | Actual effect of setting controlled attributes on the virtual outputs. |
| Monitored attributes | $M_f: V \to M$ | Calculated value of monitored attributes. |
| Mode classes | $Z_f: M \times T \times Z \times C \to Z$ | How to determine mode of each mode class. |
| Terms | $T_f: M \times T \times Z \times C \to T$ | How to determine value of each term. |
| Virtual inputs | $V_g: M \to V$ | Ideal behavior of virtual input—how value of monitored attributes affects values of virtual inputs. |
| | $V_f: I \to V$ | Actual value of virtual input. |
| Virtual outputs | $C_g: W \to C$ | Ideal behavior of virtual outputs—effect of setting the virtual outputs on controlled attributes. |
| | $O_f: W \to O$ | Actual behavior of virtual outputs—effect of setting the virtual output on physical outputs. |
| Physical inputs | $I_h: M \to I$ | Ideal behavior of physical input—how values of monitored attributes affect values of physical inputs. |
| Physical outputs | $C_h: O \to C$ | Ideal behavior of physical outputs—effect of setting physical outputs on controlled attributes. |

As discussed above, Design Model 120 comprises a decomposition of all or part of Behavioral Model 118 into classes that are responsible for distinct concerns. This decomposition of behavior of the system is independent of the system's run-time organization. The present invention enables the user to record the prose rationale for the class, which may describe a decision hidden by the class interface or its responsibility. For classes that provide resources, i.e., attribute values that can be read or set, usable by other classes, the present invention enables the user to provide a behavioral model of the externally visible behavior of the class, which is referred to as its Provides Interface.

The present invention additionally enables the user to provide an internal design model for each class describing how it accomplishes its behavior. The internal design model is hidden by the class. As long as the Provides Interface is maintained, classes using it will be unaffected by changes to the internal design model.

A set of attributes labeled Provides Interface in accordance with one embodiment of the present invention comprises two sets of attributes: a first set of attributes labeled Provides Inputs, which are attributes whose values other classes may set using the Provides Interface, and a second set of attributes labeled Provides Outputs, which are attributes whose values other classes may obtain from Provides Interface. The externally visible behavior of a class is provided by the declarations of the attributes in the set of attributes Provides Interface and by ideal value functions. An ideal value function may describe the value of an attribute in the set of attributes Provides Output or the effect of setting the value of an attribute in the set of attributes Provides Input.

Similarly, a set of attributes labeled Requires Interface in accordance with one embodiment of the present invention comprises two sets of attributes: a first set of attributes labeled Requires Inputs, which are attributes whose values a class must obtain from outside the class, and a second set of attributes labeled Requires Outputs, which are attributes external to the class whose values the class must set. Functions specify the values of attributes in Requires Outputs.

A class may contain an additional set of attributes, called Local. Functions specify the values of attributes in the set Local.

The internal design model hidden by a class includes the sets of attributes comprising Requires Inputs, Requires Outputs, and Local. Furthermore, it includes the declarations of those attributes and functions associated therewith. The functions hidden by a class provide an internal design model of the portion of class behavior specified by those functions.

Figure 4:
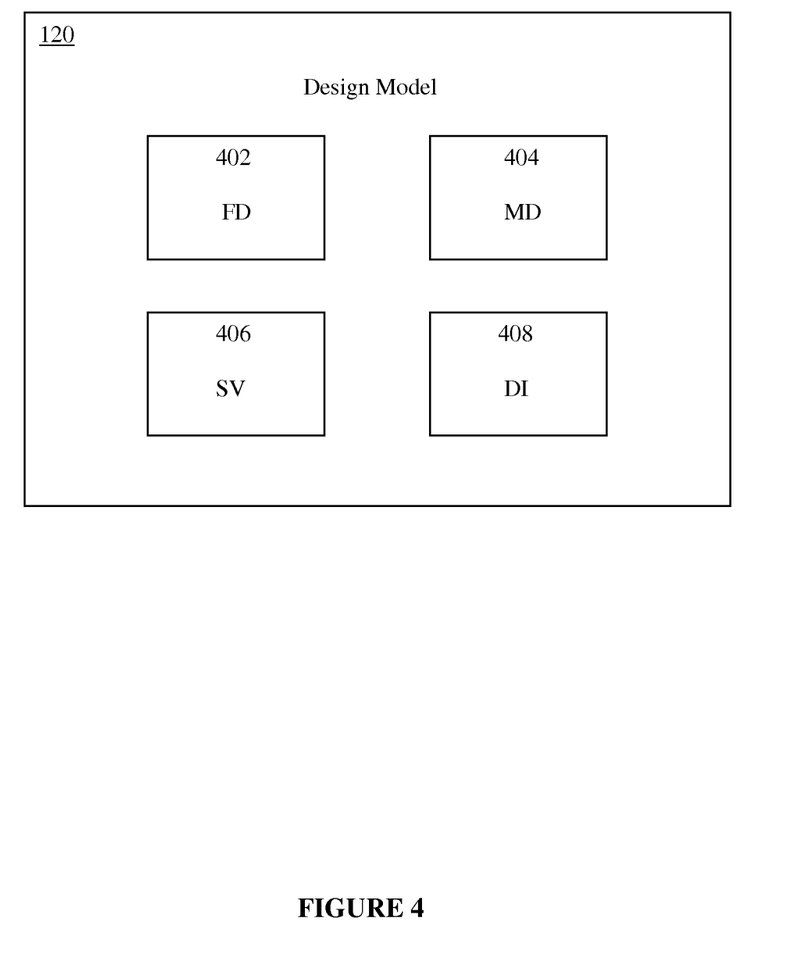
FIG. 4 illustrates components of an exemplary Design Model in accordance with the present invention.

As illustrated in FIG. 4, Design model 120 may be decomposed, for example, into a Function Driver (FD) class 402, Mode Determination (MD) class 404, System Value (SV) class 406, and Device Interface (DI) class 408. Any or all of the classes may be further decomposed into subclasses.

FD class 402 will now be described in more detail.

All controlled attribute functions, $C_{71}$, may be assigned to the FD class 402. Declarations of any terms and their associated functions that only one function in the FD class 402 uses and that are not used by a function in any other class in Design Model 120—$T^{FD} \subseteq T$ and $T_f^{FD} \subseteq T_f$, respectively—may be assigned to FD class 402. The declarations and associated functions of corresponding attributes are secrets of the class, which has no Provides Interface (in the exemplary embodiment, when the sets Provides Input and Provides Output are empty) and no class users. The FD class 402 sets the controlled attributes to the values specified by the controlled attribute functions. The controlled attribute and term functions—$C_f$ and $T_f^{FD}$—provide an internal design model of the class behavior. In the exemplary embodiment, Requires Output includes controlled attributes, C; Local includes attributes $T^{FD}$, whereas other attributes referenced by functions $C_f$ and $T_f^{FD}$ are included in Requires Input.

MD class 404 will now be described in more detail.

Mode class attributes and functions are assigned to MD class 404. The mode class attributes have public visibility and are read-only. In the exemplary embodiment, the mode class attributes are elements of the set of attributes Provides Output. Declarations and functions of any terms that are used only by one function in MD class 404 and not by a function in any other class in Design Model 120—$T^{MD} \subseteq T$ and $T_f^{MD} \subseteq T_f$, respectively—are assigned to MD class 404. Such term declarations and all functions are secrets of MD class 404. MD class 404 provides the values of the mode class attributes, which $Z_f$ describes. The present invention enables the user to include in each mode class attribute declaration, an interpretation of the attribute's value, which describes its behavior. The term attribute declarations and the functions in MD—$Z_f$, $T^{MD}$, and $T_f^{MD}$—provide an internal design model of MD class 404. The interpretation of the mode class attributes describes what is visible to users of the class. The set Local includes $T^{MD}$, whereas any other attributes that are referenced by $Z_f$ and $T_f^{MD}$ are included in the set Requires Input.

SV class 406 will now be described in more detail.

All monitored attributes, M, which are elements of the set of attributes Provides Output, and controlled attributes, C, which are elements of the set of attributes Provides Input, are assigned to SV class 406. All of these attributes have public visibility. The declarations of the attributes describe their behavior: the values of the monitored attributes and the effect of setting the value of the controlled attributes. The value of a monitored attribute reflects, at any instant, the quantity or quality as described by the attribute's interpretation. Setting the value of a controlled attribute affects the quantity or quality as described by the attribute's interpretation. Term attributes that are referenced by more than one function are assigned to SV class 406—$T^{SV} \subseteq T$ and $T_f^{SV} \subseteq T_f$, respectively. The attributes $T^{SV}$ are included in the set of attributes Provides Output. The present invention enables a user to include in each term attribute declaration, an interpretation of the value of the attribute, which describes its behavior.

The present invention enables a user to provide an internal design model that satisfies the declarations of the monitored and controlled attributes and of the term attributes $T^{SV}$. The internal design model of a monitored attribute declaration is a function that calculates the monitored attribute's value in terms of the values of virtual inputs, e.g., $f_i^M: V \to m_i$. The internal design model of a controlled attribute declaration is a set of virtual output functions, each of which calculates the value of a virtual output as a function of the controlled attribute value (and perhaps of other controlled attributes), e.g., $f_i^W: C \to w_i$. The internal design model of the terms assigned to SV class 406 are the term functions, $T_f^{SV}$. In addition, the set Requires Input includes all virtual inputs, V and the set Requires Output includes all virtual outputs, W.

DI class 408 will now be described in more detail.

Declarations and function definitions of virtual inputs and virtual outputs—V, $V_g$, W, and $C_g$, respectively—and declarations of physical inputs and physical outputs—I and O, respectively—are assigned to DI class 408. The virtual inputs and virtual outputs have public visibility, and their function definitions are also visible to other classes in design model 120. Virtual inputs, V, are elements of the set of attributes Provides Output, whereas virtual outputs, W, are elements of the set of attributes Provides Input. The declarations of the physical inputs and physical outputs have private visibility, which means that they are hidden by the class. Virtual inputs are read-only. The behavior of a virtual input is its value, which is described by its ideal function (e.g., $g_i^V: M \to v_i$). Virtual outputs are write-only. The behavior of a virtual output is the effect of setting its value, which is described by ideal functions for controlled attributes whose value is affected by setting the virtual output (e.g., $g_i^C: W \to c_i$). The set Physical Inputs, I, are elements of the set Requires Input, whereas the set Physical outputs, O, are elements of Requires Output.

The present invention enables a user to provide internal design models of the virtual inputs and outputs. The internal design models are functions written in terms of physical inputs and physical outputs that implement the ideal virtual input and virtual output functions ($V_g$ and $C_g$). Because $V_g$ and $C_g$ are written in terms of monitored and controlled attributes, they are not suitable for internal design models. The internal design model of a virtual input is a function that calculates its value in terms of physical inputs (e.g., $f_i^V: I \to v_i$). The internal design model of a virtual output is a set of physical output functions, each of which calculates the value of a physical output as a function of the virtual output and perhaps of other virtual outputs (e.g., $f_i^O: W \to o_i$).

Table 5 below summarizes Design model 120.

TABLE 5

Design Model

| | Provides Interface | | Requires Interface | | Internal Design |
|---|---|---|---|---|---|
| Class | Provides Input | Provides Output | Requires Input | Requires Output | Local |
| FD | none | none | M, Z, $T^{SV}$ | C | $T^{FD}$ |
| MD | none | Z | M, Z, $T^{SV}$ | none | $T^{MD}$ |

TABLE 5-continued

Design Model

| | Provides Interface | | Requires Interface | | Internal Design |
|---|---|---|---|---|---|
| Class | Provides Input | Provides Output | Requires Input | Requires Output | Local |
| SV | C | M, $T^{SV}$ | V | W | varies |
| DI | W, $C_g$ | V, $V_g$ | I | O | varies |

The column labeled Provides Interface lists what each class makes visible to other classes. The values of attributes in the column labeled Provides Output are available to other classes, e.g., any class can determine the value of any mode class attribute $z_i$. The values of attributes in the column labeled Provides Input are settable by other classes, e.g., the controlled attribute $c_i$. Functions included in the Provides Interface, e.g., $V_g$, $C_g$ in DI class 408, specify the value of output attributes and the effect of setting input attributes. The interpretation fields of attribute declarations describe the values of and effect of setting attributes when the provided interface does not include such functions. The column labeled Internal Design lists the attributes that comprise the internal design of the classes. Attributes listed in Requires Input are obtained externally to the class. Attributes listed in Requires Output are calculated by the class and are set external to the class. Attributes listed in Local are calculated and are used within the class. All of the actual value functions, e.g., $C_f$, $T_f$, $M_f$, $Z_f$, $W_f$, and $O_f$, are part of the internal design.

Run-Time Model 122 will now be further described.

Behavioral Model 118 specifies a network of functions, each of which calculates the value of one attribute in terms of the value of other attributes. The network of functions is driven by the values of independent attributes, non-limiting examples of which may include any combination of I, V, M, T, Z, C, and W. Run-time Model 122 records the decomposition of Behavioral Model 118 into independent executable pieces, called run-time components. A reference by a function in one component to an attribute in another component implies an interface between the components. The function in the first component uses the attribute value calculated in the second component.

Aside from run-time components that require special resources (e.g., amounts of memory available only on certain processors, communications with devices that can only be accessed from particular processors), the present invention enables the user to create components that are location-transparent. The run-time components do not assume they will execute on any particular processor, nor that they will continue to execute on the same processor from one moment to the next, nor that any other run-time component will execute nor continue to execute on any particular processor. The present invention enables a user to associate quality of service, e.g., response time, reliability of particular interfaces to run-time components, and resource requirements, e.g., minimum processor speed, minimum memory, with any run-time component. Some of this information may be derived from information in the declarations of attributes included in the component (e.g., response time, precision, reliability).

Analogous to design classes, a run-time component may have a Provides Interface upon which other components may depend and a Requires Interface, which depends upon other components and other entities. The Provides Interface contains two sets of attributes. The first set, labeled Provides Outputs, comprises attributes whose values the run-time component makes available. The second set, labeled Provides Inputs, contains attributes that can be set via the run-time component. Likewise, the Requires Interface comprises two sets of attributes. One set, labeled Requires Input, contains attributes whose values the run-time component requires. The second set comprises attributes whose values the run-time component calculates and must set via the Provides Input of another component or another entity. The values of an additional set of attributes, labeled Local, are calculated by the run-time component and used internal to the component.

Figure 5:
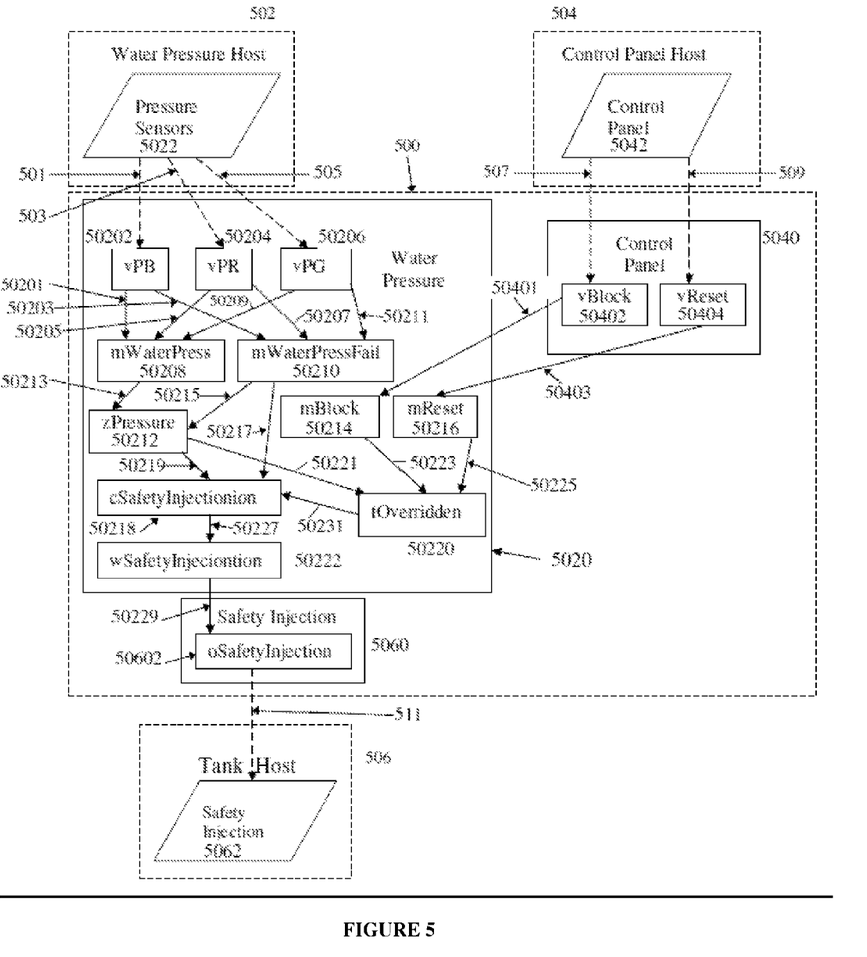
FIG. 5 schematically illustrates a network of functions as a run-time model in accordance with one embodiment of the present invention.

In exemplary embodiment, as schematically illustrated in FIG. 5, a network of functions is a run-time design 500 that operates in an environment, which includes a water pressure host 502, a control panel host 504 and a tank host 506. In the figure, a rectangle with a solid outline represents both the attribute that labels the rectangle such as vPB on 50202, and the function that calculates the value of the attribute. Dotted lines pointing into 500, e.g., 501, represent values of independent attributes. Run-time design 500 includes run-time components, i.e., executables, which are water pressure run-time component 5020, control panel run-time component 5040 and safety injection run-time component 5060. In the figure: water pressure host 502 outputs signals 501, 503 and 505 iPB, iPR and iPG, respectively, from pressure sensors 5022 to water pressure run-time component 5020; control panel host 504 outputs signals 507 and 509 (iBlock and iReset, respectively) from a control panel 5042 to control panel run-time component 5040; and tank host 506 receives input signal 511 (oSafetyInjection), from safety injection run-time component 5060, at a safety injection device 5062.

Water pressure run-time component 5020 receives input values iPB 501, iPR 503, and iPG 505 (physical inputs) from pressure sensors 5022. Water pressure run-time component 5020 additionally receives input values (virtual inputs) vBlock 50401 and vReset 50403 from control panel run-time component 5040. Water pressure run-time component 5020 includes a plurality of attributes:; vPB 50202, vPR 50204, and vPG 50206, virtual inputs which abstract from aspects of the physical inputs, 501, 503, 505; mWaterPress 50208, which represents the pressure in the tank of water associated with Water Pressure Host 502; mWaterPressFail 50210, which represents whether the system is able to accurately measure mWaterPress 50208; zPressure 50212, which indicates into which of several ranges the value of mWaterPress 50208 falls; mBlock 50214 and mReset 50216, which represent the positions of switches on Control Panel 5042, respectively; cSafetyInjection 50218, which represents whether safety injection should be on or off; tOverridden 50220, an abstraction of the Control Panel switches 50214 and 50216 and zPressure 50212 which serves to simplify the function computing cSafetyInjection 50218; and wSafetyInjection 50222, the virtual output that abstracts from aspects of the physical output oSafetyInjection 50602. Water pressure run-time component 5020 may be represented in a table form as follows:

| Water Pressure |
|---|
| Requires Input |
| iPB |
| iPR |
| iPG |
| vBlock |
| vReset |

| Water Pressure |
|---|
| Requires Output |
| wSafetyInjection |
| Local |
| vPB |
| vPR |
| vPG |
| mWaterPress |
| mWaterPressFail |
| mBlock |
| mReset |
| zPressure |
| tOverridden |
| cSafetyInjection |
| wSafetyInjection |

The name of the run-time component labels the table which may contain one or more sets of attributes representing sets to which the user assigns the attributes. Each of the sets of attributes is labeled with the name of one of the sets: provides input, provides output, requires input, requires output, and local. This aspect of the present invention is a new way of recording and organizing attributes in UML to aid in software design.

Control panel run-time component 5040 receives input values iBlock 507 and iReset 509 (physical inputs) from control panel 5042. Control panel run-time component 5040 includes attributes vBlock 50402 and vReset 50404, which abstract from aspects of the physical inputs iBlock 507 and iReset 509, respectively. Control panel run-time component 5040 may be represented in a table form as follows:

| Control Panel |
|---|
| Requires Input |
| iBlock |
| iReset |
| Provides Output |
| vBlock |
| vReset |

Safety Injection run-time component 5060 includes attribute oSafetyInjection 50602, and provides the signal 511 to Safety Injection device 5062. Safety injection run-time component 5060 may be represented in a table form as follows:

| Safety Injection |
|---|
| Provides Input |
| wSafetyInjection |
| Requires Output |
| oSafetyInjection |

Other outputs within a run-time component are local, such as for example, those indicated by lines 50201, 50203, 50205, 50207, 50209, 50211, 50213, 50215, 50217, 50219, 50221, 50223, 50225, 50227, and 50231. Items vBlock 50401 and vReset 50403 are required inputs for function computing attributes mBlock 50214 and mReset 50216, respectively. Item 50229 is a provided input to attribute oSafetyInjection 50602.

In an exemplary embodiment, the network of functions excludes the functions defining the interface of DI class 408 ($V_g$ and $C_g$), and includes the functions comprising the internal design model of DI class 408 ($V_f$ and $O_f$). It also excludes the functions describing the ideal behavior of the physical devices, $I_h$ and $C_h$. The internal design model of DI class 408 comprises virtual input functions ($V_f$), each of which specifies the value of a virtual input as a function of the value of physical inputs, and physical output functions ($O_f$), each of which specifies the value of physical output as a function of virtual outputs. The network of functions also includes the controlled attribute and term functions ($C_f$ and $T_f^{FD}$) that comprise the internal design model of FD class 402; the monitored attribute, virtual output, and term functions ($M_f$, $W_f$, $T_f^{SV}$) that comprise the internal design model of SV 406 class; and the mode class and term functions ($Z_f$ and $T_f^{MD}$) that comprise the internal design model of MD class 404.

If the network of functions does not exist, the present invention enables a user to create it via Run-time Model 114, declaring the attributes and defining the functions. Further, the present invention enables a user to change the network of functions as required, for example by changing, adding, and deleting attribute declarations and functions.

Table 6 below lists the functions in Run-time model 122.

TABLE 6

Functions in the Run-time Model

| | |
|---|---|
| $M_f: V \to M$ | How to use the virtual inputs to measure the monitored attributes. |
| $W_f: C \to W$ | How to use the virtual outputs to set the controlled attributes. |
| $T_f: M \times T \times Z \times C \to T$, where $T_f = T_f^{FD} \cup T_f^{MD} \cup T_f^{SV}$ | Values of the terms. |
| $V_f: I \to V$ | Implementation of the virtual inputs. |
| $O_f: W \to O$ | Implementation of the virtual outputs. |
| $C_f: M \times T \times Z \times C \to C$ | Behavior of the system. |
| $Z_f: M \times T \times Z \times C \to Z$ | System modes. |

Exemplary embodiments of the present invention have been described above. Specific structures of exemplary embodiments will now be described.

Modeling system 100 may be hardware, such as for example a computer system. Further, modeling system 100 may be software, such as for example a computer readable media having stored thereon, computer readable instructions operable to instruct a computer to perform functions. Still further, modeling system 100 may be a computer readable signal having therein, computer readable instructions operable to instruct a computer to perform functions. Finally, modeling system 100 may include a combination of hardware, software and signal components.

In the case where modeling system 100 is hardware, it may be a unitary device, wherein the combination of design portion 102, application portion 104 and execution portion 106 is a single device. Alternately, in the case where software modeling system 100 is hardware, it may be a plurality of devices, wherein each of design portion 102, application portion 104 and execution portion 106 is a separate device. Further, in the case where modeling system 100 is software, it may it may be a single computer readable media, wherein the combination of design portion 102, application portion 104 and execution portion 106 is a single computer readable media. Alternately, in the case where modeling system 100 is software, it may it may be a plurality of computer readable media, wherein each of design portion 102, application portion 104 and execution portion 106 is a separate computer readable media. Still further, in the case where modeling system 100 is a computer readable signal, it may a unitary signal, wherein the combination of design portion 102, application portion 104 and execution portion 106 is a single signal. Alternately, in the case where modeling system 100 is a computer readable signal, it may a plurality of signals, wherein each of design portion 102, application portion 104 and execution portion 106 is a separate signal. As alluded to above, design portion 102, application portion 104 and execution portion 106 may be a combination of hardware, software and signal components.

In the event that Design portion 102 is hardware, it may be unitary, wherein the combination of Environmental Model creating portion 108, Behavioral Model creating portion 110, Design Model creating portion 112 and Run-time Model creating portion 114 is a single device. Alternately, in the event that Design portion 102 is hardware, it may be divided, wherein at least one of Environmental Model creating portion 108, Behavioral Model creating portion 110, Design Model creating portion 112 and Run-time Model creating portion 114 is a separate device. In the event that Design portion 102 is software, it may be unitary, wherein the combination of Environmental Model creating portion 108, Behavioral Model creating portion 110, Design Model creating portion 112 and Run-time Model creating portion 114 is a single computer readable media. Alternately, in the event that Design portion 102 is software, it may be divided, wherein at least one of Environmental Model creating portion 108, Behavioral Model creating portion 110, Design Model creating portion 112 and Run-time Model creating portion 114 is a separate computer readable media. In the event that Design portion 102 is a computer readable signal, it may be unitary, wherein the combination of Environmental Model creating portion 108, Behavioral Model creating portion 110, Design Model creating portion 112 and Run-time Model creating portion 114 is a single signal. Alternately, in the event that Design portion 102 is a computer readable signal, it may be divided, wherein at least one of Environmental Model creating portion 108, Behavioral Model creating portion 110, Design Model creating portion 112 and Run-time Model creating portion 114 is a separate signal. Finally, Environmental Model creating portion 108, Behavioral Model creating portion 110, Design Model creating portion 112 and Run-time Model creating portion 114 may be a combination of hardware, software and signal components.

In the event that Application portion 104 is hardware, it may be unitary, wherein the combination of Environmental Model 116, Behavioral Model 118, Design Model 120 and Run-time Model 122 is a single device. Alternately, application portion 104 may not be unitary, wherein at least one of Environmental Model 116, Behavioral Model 118, Design Model 120, and Run-time Model 122 may be a separate device. In the event that Application portion 104 is software, it may be unitary, wherein the combination of Environmental Model 116, Behavioral Model 118, Design Model 120 and Run-time Model 122 is a single computer readable media. Alternately, application portion 104 may not be unitary, wherein at least one of Environmental Model 116, Behavioral Model 118, Design Model 120, and Run-time Model 122 may be a separate computer readable media. In the event that Application portion 104 is a computer readable signal, it may be unitary, wherein the combination of Environmental Model 116, Behavioral Model 118, Design Model 120 and Run-time Model 122 is a single signal. Alternately, application portion 104 may not be unitary, wherein at least one of Environmental Model 116, Behavioral Model 118, Design Model 120, and Run-time Model 122 may be a separate signal.

Figure 6:
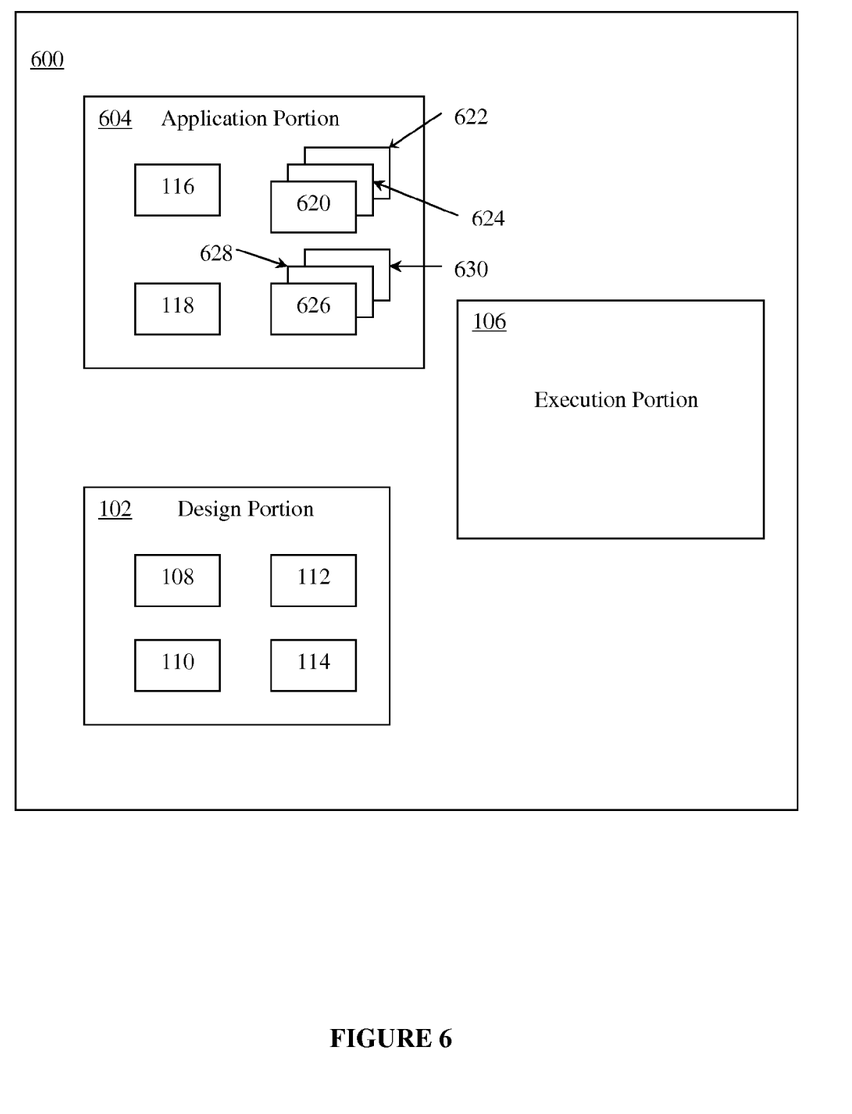
FIG. 6 illustrates another modeling system in accordance with one aspect of the present invention.

Another embodiment of the present invention is illustrated in FIG. 6, wherein the modeling system 600 includes design portion 102, an application portion 604 and execution portion 106. Like numbered items in FIG. 1 and FIG. 6 are similar in form and function. Accordingly, as illustrated in FIG. 6, modeling system 600 differs from modeling system 100 in that modeling system 600 includes a plurality of Design Models 620, 622 and 624 and a plurality of Run-time Models 626, 628 and 630. In particular, in this exemplary embodiment of the present invention, modeling system 600 supports a plurality of design models and run-time models to fit the needs of a user. Of course, the invention is not limited to the schematically illustrated example of three design models or three run-time models. Any number of design models or run-time models may be used as required by the user.

In another exemplary embodiment of the invention, the modeling system 100 can include a different type of attribute known as meta-attributes, or quality attributes. In this embodiment, the attributes previously discussed herein can be known as value attributes. In general, each value attribute can have one or more associated meta-attributes.

More specifically, there is a variety of reasons for maintaining meta-data about value attributes in a software modeling system. For example, limitations in sensors or other sources of "input" value attributes, e.g., monitored, virtual input, physical input, can lead to them being incomplete, inaccurate, and ambiguous. Therefore, relevant meta-data can include accuracy, precision, timeliness, reliability, and availability, which can overlap with information in an environmental attribute declaration (e.g., see Table 1 herein). This meta-data can also be relevant for value attributes whose calculation depend upon the "input" value attributes, e.g., term, virtual output, controlled, output. For many value attributes, unit of measure, e.g., feet, meters, seconds, milliseconds, can also be useful, associated meta-data. It also useful to allow meta-data to record that a device that provides some input, or that accepts some output, has failed, or is failing, by associating it with the input or output, respectively. The meta-data can also include information relating to the time and location of an attribute.

For example, some meta-attributes can be Booleans, such as the following that include the name of the meta-attribute and a short description:

Valid. If an attribute is not valid, then its value is undefined.
Fail. The corresponding attribute value is undefined.
Reliable. There are no known problems with source of corresponding attribute.
Available. Corresponding attribute value is available.
Changed. True while corresponding attribute is changing value.
Reasonable. The corresponding attribute value is within reasonable bounds.

Another example of meta-attributes can include network quality of service variables. For example, the meta-attributes can be latency, dropValuesToMaintainTiming, and bestEffort. To clarify, while the example value attributes disclosed herein are scalars, they do not necessarily need to be, but could be complex data types instead.

Therefore, in this exemplary embodiment, and as used herein, "attributes" can refer to the union of value attributes and meta-attributes. Meta-attributes can refer to a "quality" of a value attribute, e.g., precision, accuracy, allowed delay, staleness, failure. As with value attributes, associated with every meta-attribute can be a function that computes its value.

Table 7 illustrates the contents of a meta-attribute declaration. A meta-attribute can be observed or monitored during system operation. It can also be imposed on or required of an attribute during system operation. Accordingly, associated with every attribute there may be two sets of meta-attributes. One set, required meta-attributes, can specify qualities the associated value attribute is required to exhibit. Another set, observed meta-attributes, can specify qualities the associated value attribute is observed to exhibit during execution.

TABLE 7

Meta-Attribute Declaration

| Field | Description |
| --- | --- |
| Name | User-assigned name of the meta-attribute. |
| Type | Name of the type of the meta-attribute or a list of values that it can assume. |
| Unit of measure | When applicable, name of the unit of measure of the meta-attribute value. |
| Interpretation | Description of how the meta-attribute value relates to the environmental aspect it denotes, which may include diagrams and drawings. |

Let $B^x = \{b_i\}$ denote the set of observed or monitored meta-attributes associated with value attribute x. Likewise, let $R^x = \{r_i\}$ denote the set of meta-attributes required of, or imposed on, value attribute x. Analogous to the value attributes, for each observed meta-attribute $b_i$, there can be a function, $f_i^b$, that gives its value. In the case of required meta-attribute, $r_i$, a relation, $f_i^r$, can specify the range of acceptable values of $r_i$. The range of any meta-attribute function or relation may comprise any value attribute or meta-attribute. Further, the range of any attribute function may include any meta-attribute of any value attribute in its range.

The foregoing description of various preferred embodiments of the invention have been presented for purposes of illustration and description. It is not intended to be exhaustive or to limit the invention to the precise forms disclosed, and obviously many modifications and variations are possible in light of the above discussion. The exemplary embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

The invention claimed is:

1. A computer system for modeling a software application to be used in an environment, comprising:

an environmental model creating portion operable to enable a user to create an environmental model comprising a first set of attributes of the environment, each of the first set of attributes comprising a value attribute, a declaration, and an associated set of meta-attributes, each of said meta-attributes comprising at least one of a declaration and function; wherein the environmental model creating portion is implemented in the computer system that comprises instructions stored in a machine-readable medium and a processor that executes the instructions;

a behavioral model creating portion operable to enable the user to create a behavioral model to describe behavior of the software application at a boundary of the software application and the environment, the behavioral model comprising a second set of attributes, which comprise a portion of the first set of attributes, wherein the portion of the first set of attributes is shared between the environmental model and the behavioral model; each of the second set of attributes comprising a value attribute having at least one of a declaration and function, and a set of meta-attributes, each of said meta-attributes having at least one of a declaration and function; wherein changes to an attribute in the behavioral model is reflected automatically in all models that share the attribute, and wherein the behavioral model creating portion is implemented in the computer system that comprises instructions stored in a machine-readable medium and a processor that executes the instructions;

a design model creating portion operable to enable the user to create a design model comprising a first decomposition of the second set of attributes into a first plurality of groups, wherein the design model creating portion is implemented in the computer system that comprises instructions stored in a machine-readable medium and a processor that executes the instructions; and a run-time model creating portion operable to enable the user to create a run-time model comprising a second decomposition of the second set of attributes into a second plurality of groups, the run-time model being operable to record the decomposition of the behavioral model into run-time components, wherein the run-time model creating portion is implemented in the computer system that comprises instructions stored in a machine-readable medium and a processor that executes the instructions.

2. The computer system of claim 1, wherein said design model creating portion is further operable to create a plurality of distinct design models, each of which comprises a decomposition of the second set of attributes into a distinct plurality of groups, each of the distinct plurality of groups being different than the second plurality of groups.

3. The computer system of claim 1, wherein said run-time model creating portion is further operable to create a plurality of distinct run-time models, each of which comprises a decomposition of the second set of attributes into a distinct plurality of groups, each of the distinct plurality of groups being different than the first plurality of groups.

4. The computer system of claim 1, wherein the value attribute associated with each attribute has zero or more associated meta-attributes.

5. The computer system of claim 4, wherein the associated meta-attributes of each value attribute comprise two sets of meta-attributes, wherein the two sets of meta attributes are required meta-attributes and observed meta-attributes.

6. The computer system of claim 5, wherein the required meta-attributes specify zero or more qualities the associated value attribute is required to exhibit.

7. The computer system of claim 5, wherein observed meta-attributes specify zero or more qualities the associated value attribute is observed to exhibit during execution.

8. A method of modeling a software application to be used in an environment, said method comprising:

creating an environmental model comprising a first set of attributes of the environment, each of the first set of attributes comprising a value attribute, a declaration, and a set of associated meta-attributes, each of said meta-attributes comprising at least one of a declaration and function;

creating a behavioral model to describe behavior of the software application at a boundary of the software application and the environment, the behavioral model comprising a second set of attributes, which comprise a portion of the first set of attributes, wherein the portion of the first set of attributes is shared between the environmental model and the behavioral model; each of the second set of attributes comprising a value attribute and at least one of a declaration and function, and a set of meta-attributes, each of said meta-attributes having at least one of a declaration and function; wherein changes to an attribute in the behavioral model is reflected automatically in all models that share the attribute;

creating a design model comprising a first decomposition of the second set of attributes into a first plurality of groups; and creating a run-time model comprising a second decomposition of the second set of attributes into a second plurality of groups, the run-time model being operable to record the decomposition of the behavioral model into run-time components.

9. The method of claim 8, wherein creating a design model further comprises creating a plurality of distinct design models, each of which comprises a decomposition of the second set of attributes into a distinct plurality of groups, each of the distinct plurality of groups being different than the second plurality of groups.

10. The method of claim 8, wherein creating a run-time model further comprises creating a plurality of distinct run-time models, each of which comprises a decomposition of the second set of attributes into a distinct plurality of groups, each of the distinct plurality of groups being different than the first plurality of groups.

11. The method of claim 8, wherein the value attribute associated with each attribute has zero or more associated meta-attributes.

12. The method of claim 11, wherein the associated meta-attributes comprise two sets of meta-attributes, wherein the two sets of meta-attributes are required meta-attributes and observed meta-attributes.

13. The method of claim 12, wherein the required meta-attributes specify zero or more qualities the associated value attribute is required to exhibit.

14. The method of claim 12, wherein observed meta-attributes specify zero or more qualities the associated value attribute is observed to exhibit during execution.

15. A computer system comprising computer readable instructions stored in a machine-readable medium and a processor that executes the instructions, the computer readable instructions being capable of instructing the computer system to enable a user to model a software application to be used in an environment, and to perform the method comprising:

creating an environmental model comprising a first set of attributes of the environment, each of the first set of attributes comprising a value attribute, a declaration and an associated set of meta-attributes, each of said meta-attributes comprising at least one of a declaration and function;

creating a behavioral model to describe behavior of the software application at a boundary of the software application and the environment, the behavioral model comprising a second set of attributes, which comprise a portion of the first set of attributes, wherein the portion of the first set of attributes is shared between the environmental model and the behavioral model; each of the second set of attributes comprising a value attribute having at least one of a declaration and function, and a set of meta-attributes, each of said meta-attribute having at least one of a declaration and function; wherein changes to an attribute in the behavioral model is reflected automatically in all models that share the attribute;

creating a design model comprising a first decomposition of the second set of attributes into a first plurality of groups; and creating a run-time model comprising a second decomposition of the second set of attributes into a second plurality of groups, the run-time model being operable to record the decomposition of the behavioral model into run-time components.

16. The computer system of claim 15, wherein the design model comprises computer readable instructions configured to instruct the computer to create a plurality of distinct design models, each of which comprises a decomposition of the second set of attributes into a distinct plurality of groups, each of the distinct plurality of groups being different than the second plurality of groups.

17. The computer system of claim 15, wherein the run-time model comprises computer readable instructions configured to instruct the computer to create a plurality of distinct run-time models, each of which comprises a decomposition of the second set of attributes into a distinct plurality of groups, each of the distinct plurality of groups being different than the first plurality of groups.

18. The computer system of claim 15, wherein the value attribute associated with each attribute has zero or more associated meta-attributes.

19. The computer system of claim 18, wherein the associated meta-attributes comprise two sets of meta-attributes, wherein the two sets of meta-attributes are required meta-attributes and observed meta-attributes.

20. The computer system of claim 19, wherein the required meta-attributes specify zero or more qualities the associated value attribute is required to exhibit.

21. The computer system of claim 19, wherein observed meta-attributes specify zero or more qualities the associated value attribute is observed to exhibit during execution.

* * * * *